Inventor
ERNST HIJMANS

Patented Dec. 4, 1945

2,390,148

UNITED STATES PATENT OFFICE 2,390,148

TOOL MOUNTING

Ernst Hijmans, The Hague, Netherlands; vested in the Alien Property Custodian

Application March 26, 1942, Serial No. 436,340
In the Netherlands November 18, 1940

2 Claims. (Cl. 82—36)

This invention relates to the mounting of machine tools on lathes or similar machines.

This invention has utility in providing a turret type mounting whereby a plurality of tools may be adjusted to predetermined positions wherein any one of the tools may perform its function or a plurality of the tools may perform their independent functions simultaneously on a single piece of work.

Referring to the drawing.

Figure 1:
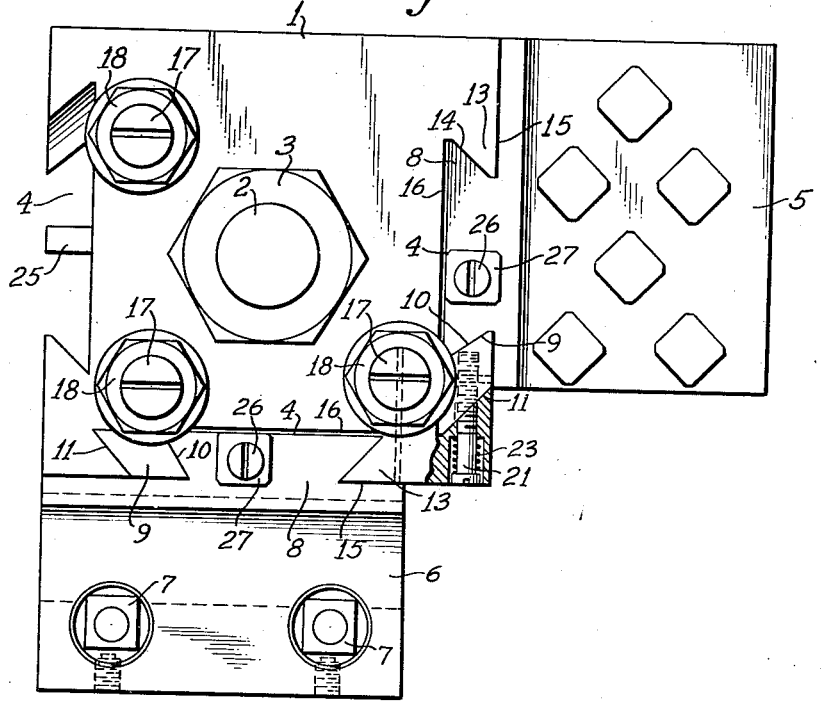
Fig. 1 is a plan view of a tool mounting embodying the invention herein.
Figure 2:
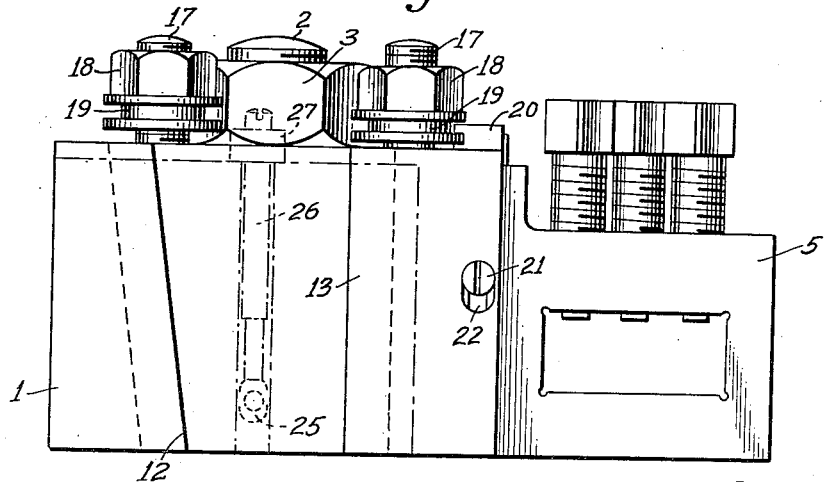
Fig. 2 is a side elevation looking from the bottom of Fig. 1, but having the forward tool holder eliminated for the purpose of clarity.

The tool post proper consists of block 1 which is polygonal and designed to present as many tool mounting faces as is desired. Such block 1 may be mounted on a lathe or other machine slide by means of bolt 2 and nut 3.

The block is herein shown of cubical form and machined to have three tool mounting faces, each face having a dovetail wedge-shaped slideway 4 extending thereacross. In one of the slideways 4 there is mounted a tool holder 5 herein shown as being adapted to mount three independent tools which may be adjacent each other and clamped in position by a set of screws. In another slideway 4 there is shown a different type of tool holder which may be adapted to mount a tool such as a boring bar, which bar may be clamped therein by screws 7.

The tool holders each have a dovetail slideway connection comprising an extension 8 from the tool holder into ways 4.

These extensions 8 only partially fill the slideway but the remainder of such way is taken up by wedged shaped gibs 9, one side face 10 of which extends in a plane parallel to the axis of the holder, while the opposite side 11 lies in a plane intersecting the plane of side 10, thereby providing a trapezoidal cross sectional shape thereto. In forcing the gib downwardly between one side of the slideway 12, and the extension 8 its contour causes the tool holder to be firmly locked in the desired position by forcing extension 8 against the edge 13 of the slideway.

Face 14 on the tool holder extension 8 and face 15 on the tool holder body have a ground finish to insure a nicety of fit between the tool holder and the tool post. The extensions 8 need not necessarily extend to the floor 16 of the slideway as the clamping or locking takes place between the faces 14 and 15 acting on the block portion 13 and the gib acting between the extension and the opposite side of the slideway.

Means may be provided on the block 1 to forceably wedge the gib into locking position and likewise to withdraw the gib. To this end a bolt 17 is threaded into the block adjacent each gib and a nut 18 is provided there on which when rotated, lifts and lowers grooved collar 19 in which may ride a lug 20 carried by the gib.

Means are also provided that when the tool holders are removed and other tool holders placed in the same slideway or when for some reason the same tool holder will be replaced, the gibs will not fall from the slideway. Each gib is provided with a bolt 21 threaded into and extending through slot 22 allowing it to be slideably attached to block 1 and having a spring 23 about the bolt between the edge of the slot 22 and the bolt head, urging the gib into proper positioning.

In the slideways 4 there are abutments 25. Through each of the extensions 8 a screw 26 is provided, the bottom of which may contact the stop or abutment 25 and the initial position of the tool holder may be adjusted before being locked in place.

Such arrangement as herein described allows for a resetting of any tool employed to within .0005". Furthermore, tools may be exchanged and various combinations quickly and accurately mounted.

What is claimed and it is desired to secure by United States Letters Patent:

1. A machine tool mounting comprising a tool post having a dovetail slideway tapering from one end to the other, a tool holder having a dovetail shaped extension slideable in said slideway and contacting one side thereof, a gib between the other side of said slideway and the extension, said gib being trapezoidal in cross-section, means in said slideway against which the tool holder may abut for positioning the tool holder as to the tool post, and means for slideably moving said gib to lock the tool holder as positioned.

2. The construction set forth in claim 1 wherein adjustable initial positioning tool holder means are provided within the slideway.

ERNST HIJMANS.